Patented Oct. 12, 1954

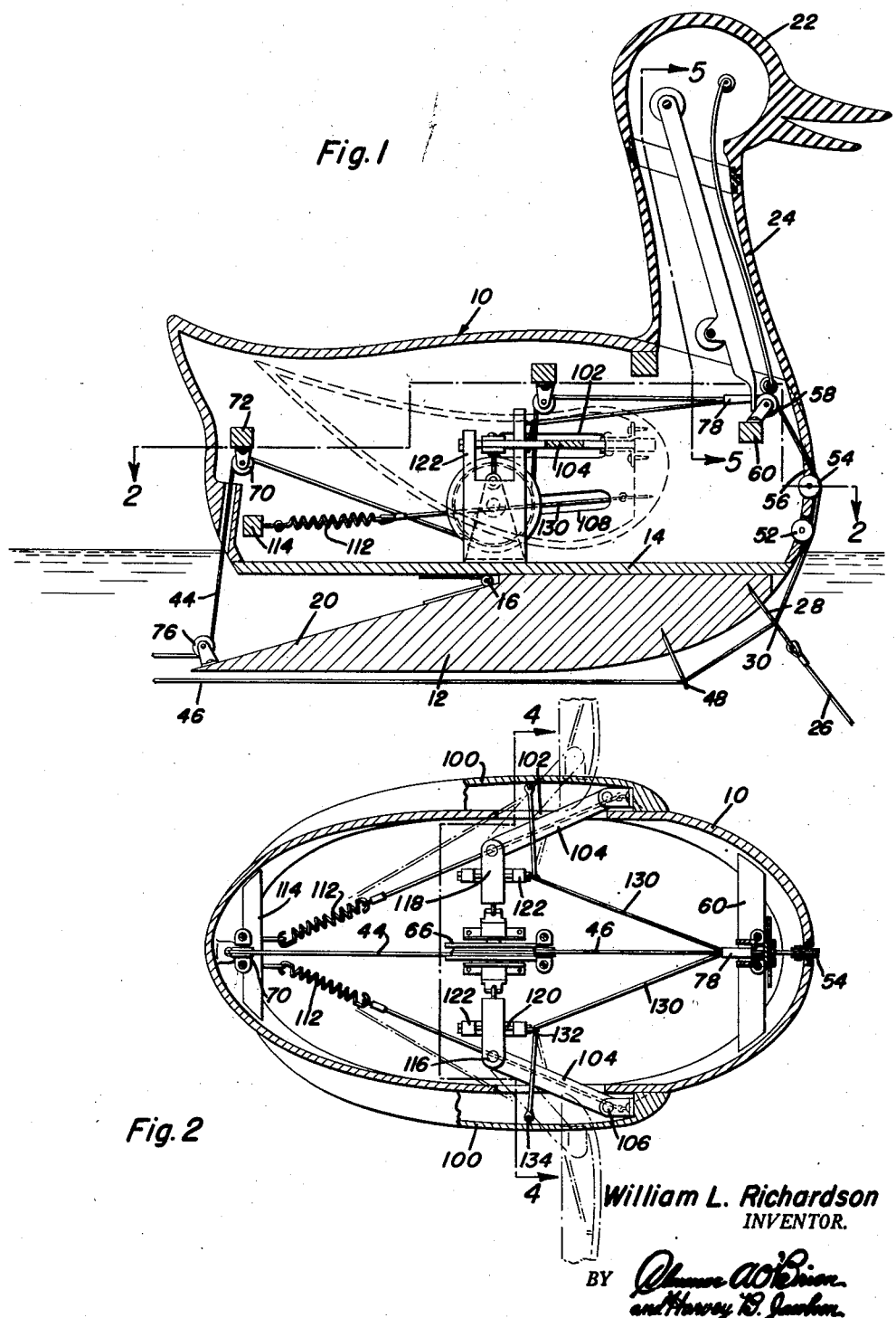

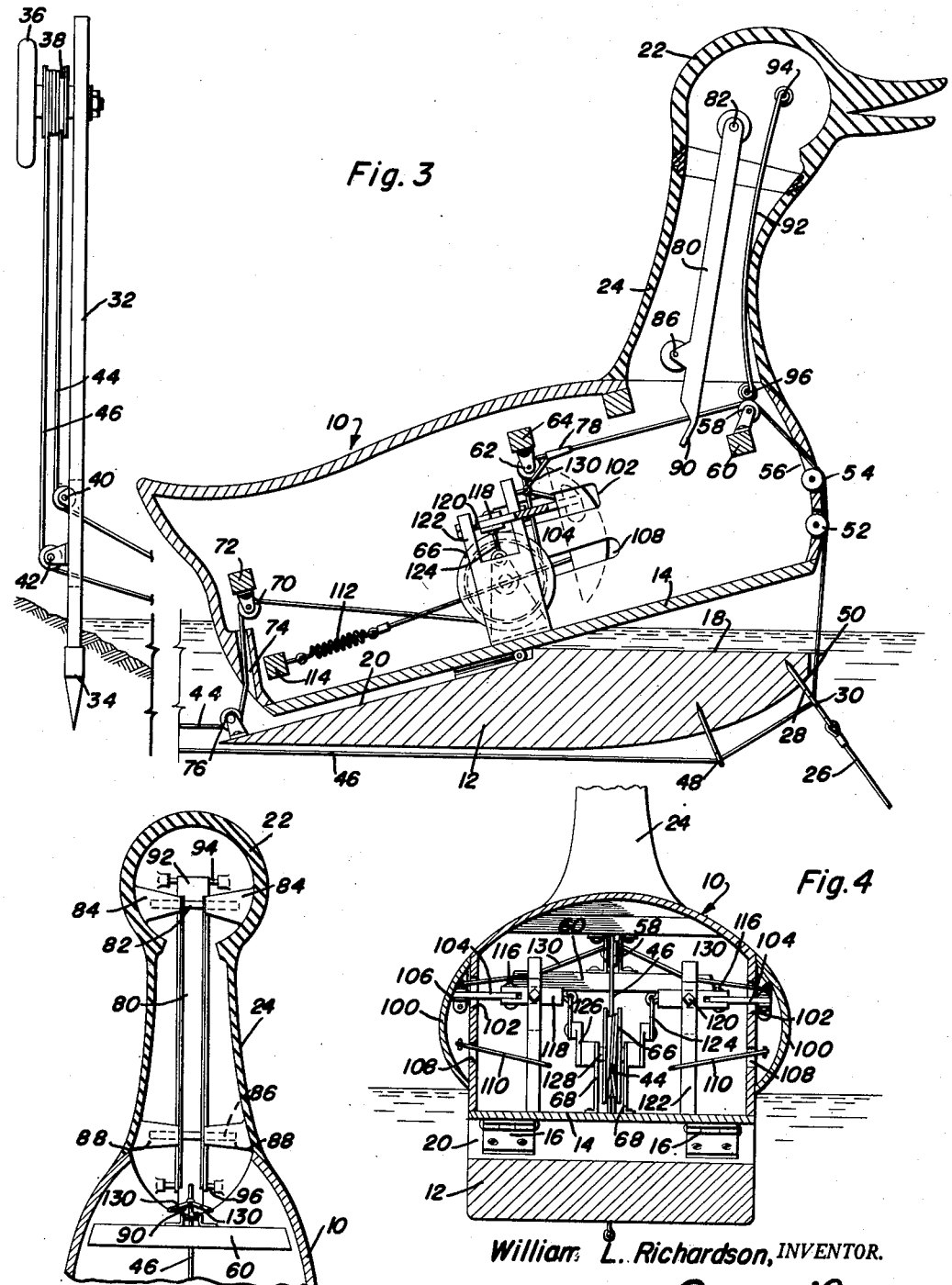

2,691,233

UNITED STATES PATENT OFFICE 2,691,233

DUCK DECOY

William L. Richardson, Keota, Iowa

Application May 23, 1951, Serial No. 227,797

6 Claims. (Cl. 43—3)

This invention comprises novel and useful improvements in a duck decoy and more specifically pertains to an improved duck decoy which shall be capable of remote control by a hunter in a duck blind for more realistically simulating the life-like movements of a duck.

The primary object of this invention is to provide a remotely controlled animated duck decoy wherein the position of the duck upon the water may be varied or shifted as desired; wherein the head of the duck may be moved; and wherein the wings of the duck may be caused to have both a horizontal and vertical movement to simulate the flapping of the duck's wings.

These, together with various ancillary features and objects of the invention, which will later become apparent as the following description proceeds, are attained by the present invention, a preferred embodiment of which has been illustrated, by way of example, in the accompanying drawings, wherein:

Figure 1 is a vertical central sectional view through a duck decoy incorporating therein the principles of this invention, the duck being shown in its normal or rest position;

Figure 2 is a horizontal sectional view through the decoy of Figure 1, taken substantially upon the plane indicated by the broken section line 2—2 of Figure 1, and alternative position of the wings being indicated in dotted lines therein;

Figure 3 is a view similar to Figure 1 but indicating the remote control for operating the duck, the latter being indicated in another position of its adjustment;

Figure 4 is a vertical transverse sectional view, taken substantially upon the plane indicated by the broken section line 4—4 of Figure 2 and showing certain details of the internal construction and operating mechanism of the decoy; and, Figure 5 is a vertical transverse sectional detail view taken substantially upon the plane indicated by the section line 5—5 of Figure 1.

Referring now more specifically to the accompanying drawings, wherein like numerals designate similar parts throughout the various views, it will be seen that the numeral 10 designates generally the body portion of the decoy which simulates both in shape, size and appearance the body of a duck, which is mounted upon a mounting means or supporting keel member 12.

It should be here understood that both the body 10 and the supporting keel member 12 may be formed of various suitable and convenient materials, the principles of this invention being nowise limited thereby.

Preferably the bottom of the duck body 10 is provided with a flat bottom wall or supporting base 14 which adjacent its midpoint is hingedly connected as by a hinge 16 to the supporting keel member 12 for movement about an axis which is horizontal and extends transversely of the duck body and of the supporting keel member 12.

The supporting keel member 12 is provided upon its upper surface with a pair of angularly related supporting surfaces, the surface indicated at 18 being substantially horizontal, while that indicated at 20 is slightly inclined to the surface 18, and adjoins the same at about the axis of the horizontally disposed pivot or hinge 16.

As shown in Figures 1 and 3, the body 10 is so mounted on the supporting member or keel 12 that the bottom wall or base 14 of the body may be selectively positioned upon the horizontal supporting surface 18, at which time the duck body is in its normal floating position, to simulate the actual position of a duck floating in the water; or the body may be pivoted to the position shown in Figure 3, at which time the rear portion of the bottom wall 14 will be disposed at close relation to the inclined supporting surface 20. In this position, the duck body will be disposed in a manner which closely simulates the bobbing motion of a duck.

The duck body 10 is of hollow construction, having a number of openings therein for a purpose which will be subsequently apparent, and is provided with a hollow head 22 which is supported upon the body 10 by a hollow neck member 24. The neck 24 is preferably of a resilient material such as rubber or the like whereby the same may be readily stretched or distorted by a mechanism to be subsequently set forth, to thereby impart relative movement to the duck head 22.

Conveniently, an anchor cable 26 may be attached to the support member 12 for anchoring the same in a suitable location before the blind of a hunter. This anchoring cable provided with any suitable anchor, not shown, is attached to an eyelet at the end of a bolt or similar member 28 which is provided with a further guiding eyelet 30 intermediate its ends for a purpose which will be subsequently apparent.

A remote control mechanism is provided whereby the hunter may control and manipulate the motions of the duck, of its head and wings from his concealed position behind the duck blind. This remote control means may conveniently comprise a supporting standard 32 provided with a pointed lower extremity 34 by means of which the same may be mounted in the earth, the standard having rotatably journaled upon its upper end a handwheel 36 with a grooved pulley 38 mounted thereon. Adjacent its lower end, the standard 32 is provided with a pair of guide pulleys 40 and 42. The control means further includes an endless flexible cable of any desired character this cable having two flights or reaches 44 and 46 which are entrained over the pulley 38, being wound thereabout to cause rotation of the cable, and being entrained over the guide pulleys 40 and 42. The flights of the cable then extend below the water to the duck decoy. One flight, such as that indicated at 46, may pass beneath the supporting member 12, through guide eyelets 48 thereon, and through the eyelet 30 of the member 28, and is thence passed upwardly through a guiding notch 50 disposed in the forward end of the supporting member 12, and upwardly into the body of the duck decoy. Upon the front wall of this body, there are provided a pair of guiding pulleys 52 and 54 which are suitably rotatably mounted upon the body of the duck, and preferably within the same as shown, the flight 46 of the cable passing into the interior of the duck through the slot 56 adjacent the pulley 54.

From the pulley 54, the cable then passes over the guide pulley 58 carried by a suitable transverse supporting bar 60 within the interior of the duck, and thence over a further guide pulley 62 carried by a second crossbar 64. From the guide pulley 62, the cable passes downwardly and thence is wound about a large pulley or drum 66, journaled between supporting standards 68, 68 within the body of the duck, and from thence the cable continues as the cable flight 44, a further guide pulley 70 carried by a transverse support bar 72 in the body of the duck, thence downwardly through a slot or opening 74 in the rear wall of the duck, and over a guide pulley 76 mounted upon the rear end of the inclined surface 20 of the keel 12.

From the foregoing, it will now be understood that upon rotation of the control wheel 36, the endless cable will be caused to move forward or backward upon its associated series of pulleys, and during this travel of the cable oscillation or rotation will be imparted to the large pulley 66.

This oscillating travel of the endless cable is utilized to directly impart the rocking or bobbing motion of the duck body 10 about its transverse horizontal axis of its hinged connection 16; and also to impart life-like movement to the wings of the duck body as well as to the head of the same.

To effect this bobbing motion, a portion of the cable disposed between the pulleys 58 and 62 has fixedly secured thereto a stop member 78 which thus partakes of the oscillating travel of the cable. The two pulleys 58 and 62 constitute abutments which limit travel of the stop member 78 in opposite directions. It will therefore be evident that when the cable is rotated or oscillated in such a manner as to cause the stop 78 to engage the pulley 58 which constitutes an abutment, continued movement of the cable in that direction will cause the duck body to pivot forwardly and downwardly until the same assumes the position shown in Figure 1 with the bottom of the duck resting upon the horizontal support surface 18. However, upon reverse movement of the cable, the stop 78 will move towards and engage the pulley 62 which constitutes an abutment therefor, and continued movement of the cable will then cause a backward and downward pivoting movement of the duck body until the same assumes the position shown in Figure 3. It will thus be seen that the movement of the stop 78 between the two abutments causes and controls the pivoting movement of the duck body upon its mounting or supporting keel means 12.

In accordance with this invention, the stop member 78 is also utilized to effect movement of the head 22 in synchronization with the bobbing or rocking movement of the body upon its supporting member. For that purpose, there is provided an actuating lever 80 which at its upper end is provided with a transverse supporting pin 82 which is anchored in oppositely disposed integral projections 84 within the head 22 of the duck, as shown particularly in Figure 5. Adjacent its lower end, the lever is provided with a further pivot pin 86 which is similarly anchored in integral oppositely disposed inward projections 88 forming the lower portion of the neck 24. The bottom or end portion of the lever 80, indicated at 90, is apertured to permit passage of the cable therethrough, thereby when the stop 78 is in the position shown in Figure 3, the lever and consequently the duck's neck will be free to assume their normal rest position. However, when the cable is moved to cause the stop 78 to move over to the abutment 58, the stop will engage and carry with it the end portion 90 of the lever 80 moving the latter to the position shown in Figure 1. This movement of the lever will distort the neck of the duck from the position shown in Figure 3 to the position shown in Figure 1, thereby causing a realistic movement of the duck's neck and head.

The natural resiliency of the duck's neck may be relied to restore the neck and head to their normal position when the stop 78 is withdrawn from engagement with the extremity 90 of the lever. However, it is preferred to provide a resilient or stiff wire 92 having its upper end anchored as by a pin 94 within the head of the duck, and having its lower extremity anchored by a pin 96 suitably secured within the body of the duck. The inherent resiliency of the spring will tend to restore the neck and head to the position shown in Figure 1, but will permit distortion of the neck and head from the position shown in Figure 1 to that shown in Figure 3 under the actuation of the above mentioned mechanism.

As shown more clearly in Figures 2 and 4, the sides of the body of the duck are provided with a pair of wings 100 which are mounted for both vertical and horizontal movement to simulate the flapping motion of a duck's wings.

For this purpose, the side walls of the duck body are provided with slots 102 and actuating arms 104 extend through these slots and are pivotally secured to the wings as by the hinged brackets 106. These brackets are provided with vertically disposed pivots whereby horizontal swinging movement of the wings with respect to the arms 104 will be permitted, while the wings will move vertically with vertical movement of the arms 104 as set forth hereinafter.

As shown more clearly in Figure 4, and also in Figures 1 and 3, the side walls of the duck body, below the slots 102, are provided with further slots 108 and cables 110 are secured to the inside surfaces of the wings and extend through the slots 108 into the interior of the duck body, being fastened to tension springs 112, see Figure 2, which in turn are anchored to a crossbar 114 within the rear end of the duck body. These springs and cables serve to yieldingly urge the wings into their horizontal open position, shown in broken lines in Figure 2, but will yieldingly permit horizontal swinging movement of the wings to a lateral closed position shown in full lines in Figure 2.

As shown more clearly in Figures 2 and 4, the supporting arms 104 for the wings are pivoted to vertically disposed pivot pins 116, by which the inner ends of the arms are received between the bifurcated ends of levers 118. The arms 104 can thus swing horizontally about the vertical pivot pins 116 and the levers 118, while the wings 100 may likewise swing horizontally about the vertical pivot pins of the hinge brackets 106 on the ends of the arms.

At their mid-portions, the levers 118 are pivotally mounted as at 120 to horizontal pivot pins carried by fulcrum standards 122 rising from and mounted upon the bottom wall of the duck. It will thus be seen that when the levers 118 pivot vertically about their horizontal pivot pins 120, they will carry with them and cause vertical pivoting movement of the wings.

This vertical pivoting movement is effected by means of connecting links 124 which are swivelly attached to the ends of the levers 118, and are pivotally connected to crank arms 126 mounted upon the exterior of the standards 68 and upon the opposite ends of the axle 128 to which the drum or pulley 66 is fixedly secured.

From the above, it will now be understood that as the pulley 66 is rotated by the remote control device through the flexible cable, a vertical pivoting movement will be imparted to the duck's wings causing the same to raise and lower. This movement will be synchronized with the bobbing or rocking motion of the duck body previously described and with the movement of the duck head.

Simultaneously with the vertical pivoting movement imparted to the duck's wings in the manner previously described, there is provided an interconnected mechanism for effecting a horizontal swinging movement of the wings. This mechanism includes a pair of cables 130, see Figure 2, having their forward ends secured to the abovementioned stop 78, and passing through guides 132 mounted upon the standards 122, and from thence passing through the slots 102, where they are attached to the inside surfaces of the wings at 134. Thus, as the flexible cables are operated by the remote control, and the stop 78 is moved in an oscillating path or travel therewith, this stop will through the cables 130 selectively allow the wings to swing horizontally outward from the full line to the dotted line position shown in Figure 2 and retract these wings. It will be noted that this horizontal swinging movement of the wings is actually independent of the vertical swinging movement thereof, although a common actuating means, namely the endless cable is provided for effecting both motions.

It will thus be seen that the hunter from his concealed position behind a blind is able to very accurately animate and control the motions of the duck decoy, producing at will a ducking or bobbing motion of the duck; simultaneously moving its head and imparting a flapping motion to the wings of the duck. It will be appreciated that in some instances certain of the sub-assemblies of mechanisms hereinbefore described could be omitted and the invention could employ with only a part of the previously described structure and functions incorporated therein.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A duck decoy comprising a body simulating a duck, a keel, means mounting said body on said keel for vertical pivotal movement about a horizontal axis of said keel transverse to the longitudinal axis of said body, and remote control means connected to said body for causing pivotal movement of said body about said horizontal axis.

2. A duck decoy comprising a body simulating a duck, a keel, means mounting said body on said keel for vertical pivotal movement about a horizontal axis on said keel transverse to the longitudinal axis of said body, remote control means connected to said body for causing pivotal movement of said body about said horizontal axis, said body having a movable head, and means within said body for moving said head actuated by said remote control means.

3. A duck decoy comprising a body simulating a duck, a keel, means mounting said body on said keel for vertical pivotal movement about a horizontal axis on said keel transverse to the longitudinal axis of said body, remote control means connected to said body for causing pivotal movement of said body about said horizontal axis, said body having movable wings, and means within said body for causing movement of said wings and actuated by said remote control means.

4. The combination of claim 1 wherein said remote control means includes a cable, pulleys secured to and within said body, said cable being entrained over said pulleys, and a stop fixedly secured to a portion of said cable for movement therewith, certain of said pulleys constituting abutments engageable by said stop for causing said pivotal movement of said body.

5. The combination of claim 1 wherein said keel comprises a member having substantially angularly related adjoining support surfaces, said body being pivoted to said member at the juncture of said surfaces, each surface constituting a support for said body in one of its pivoted positions.

6. The combination of claim 1, wherein said body has a movable head and movable wings, and separate means within said body for causing movement of said head and wings and actuated by said remote control means.

References Cited in the file of this patent

UNITED STATES PATENTS

| Number | Name | Date |
| --- | --- | --- |
| 547,553 | Keller | Oct. 8, 1895 |
| 814,149 | Linebarger | Mar. 6, 1906 |
| 1,460,616 | Starbuck | July 3, 1923 |
| 1,831,286 | Chelini | Nov. 10, 1931 |
| 2,129,781 | Park | Sept. 13, 1938 |
| 2,388,378 | Garber | Nov. 6, 1945 |
| 2,434,335 | Signalness | Jan. 13, 1948 |
| 2,457,295 | Woodhead | Dec. 28, 1948 |
| 2,480,390 | Thompson | Aug. 30, 1949 |

FOREIGN PATENTS

| Number | Country | Date |
| --- | --- | --- |
| 193,738 | Great Britain | 1923 |